Figure 1:
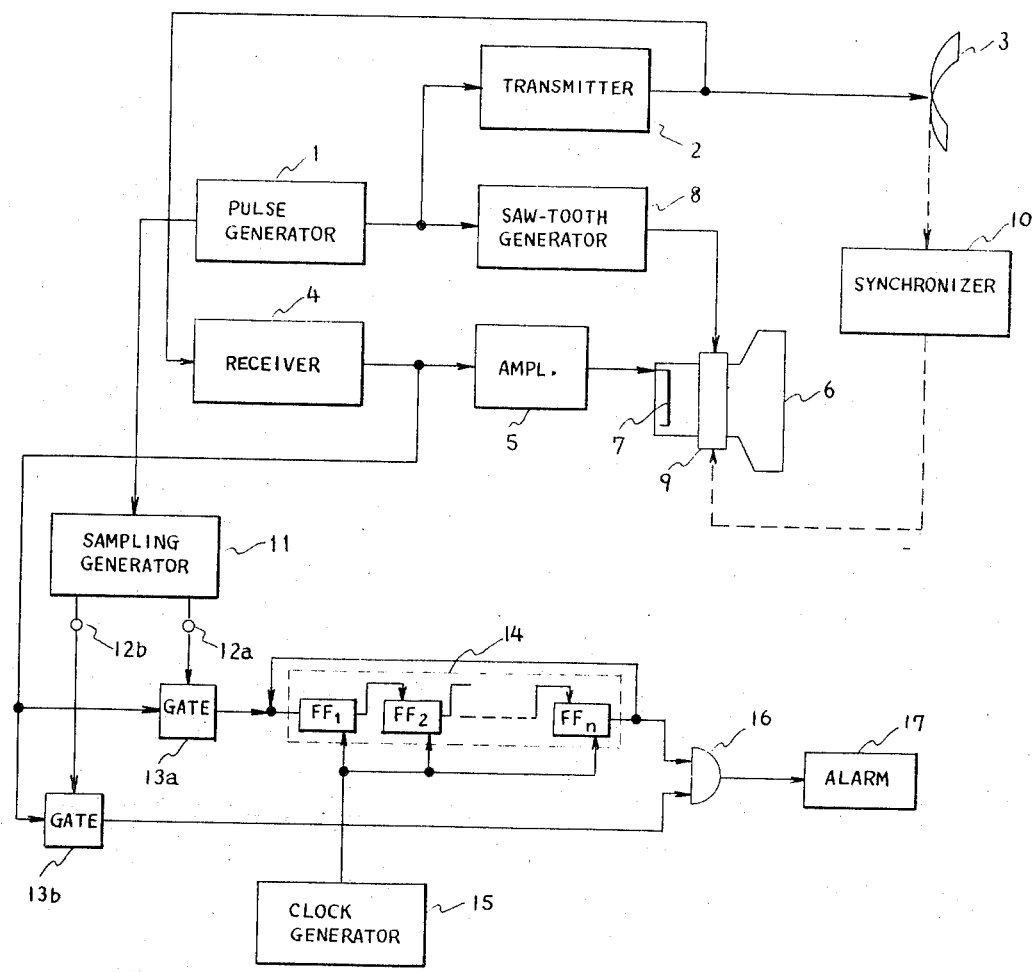

United States Patent [19]
Kubota et al.

[11] 3,787,845
[45] Jan. 22, 1974

[54] COLLISION ALARMING SYSTEM

[75] Inventors: Hiroshi Kubota, Takarazuka; Tomohiko Suzuki, Kobe, both of Japan

[73] Assignee: Furuno Electric Company, Limited, Nagasaki-ken, Japan

[22] Filed: Oct. 17, 1972

[21] Appl. No.: 298,398

[52] U.S. Cl........ 343/7 ED, 343/5 DP, 343/112 CA
[51] Int. Cl.............................................. G01s 9/02
[58] Field of Search ......... 343/5 DP, 7 ED, 112 CA

[56] References Cited
UNITED STATES PATENTS
3,052,882  9/1962  Pidhayny et al............. 343/112 CA
3,074,061  1/1963  Pidhayny et al............. 343/7 ED X
3,151,322  9/1964  Hildebrandt...................... 343/5 DP Primary Examiner—Malcolm F. Hubler
Attorney, Agent, or Firm—Eugene E. Geoffrey, Jr.

[57] ABSTRACT

A collision alarm system for detecting the course of an object and producing an alarm should its course indicate the possibility of a collision with the vehicle carrying the system. It includes a transmitter for transmitting pulses and a receiver for receiving reflected pulses. The reflected pulses are detected at at least two successive points in time with the information first detected being stored and then fed out at a predetermined later time related to the sweep rate of the transmitted pulses. The fed out pulses and the pulses detected at the second time point are compared and an alarm is sounded when a coincidence is detected.

6 Claims, 11 Drawing Figures

(1)

(2)

3,787,845

COLLISION ALARMING SYSTEM

This invention relates to a collision alarm system and more particularly to a system for detecting the position and course of an object by a radar system and energizing an alarm when a collision or extraordinary approach of the object to the subject is expected.

For example, assuming that the radar device of a ship (hereinunder referred to as "subject") displays an image of another ship (hereinunder referred to as "object"), it is completely impossible to judge from the instantaneously displayed image how near the object will approach the subject when the object is moving in the direction of the subject. Heretofore, in order to determine the closest distance of both ships at a future time to decide the dodging course of the subject, it has been suggested that the instantaneous images of the subject be plotted at predetermined time intervals and the closest distance calculated geometrically from these plots. Such a system is very time consuming and especially troublesome when many objects are displayed on the radar screen.

Accordingly, one object of this invention is to provide a device for automatically judging whether there is any possibility of a dangerous collision between the object and subject and producing an alarm signal when such a possibility is detected.

According to this invention, the collision alarm system comprises a conventional transmitting and receiving device for emitting a directional periodic pulse wave which sweeps a predetermined space at a predetermined rate and receiving a reflected wave of said wave, first means for sampling said received reflected wave at a first time point, second means for sampling said received reflected wave at a second time point, which is different from said first time point, means for storing the sample of said first sampling means and feeding it out at a rate which corresponds to the sweeping rate of said transmitting and receiving device, means for comparing the output of said storing means with the sample of said second sampling means and producing an output when a coincidence is detected, and an alarm device driven by the output of said comparing means.

Other objects and features of this invention will be better understood from the following description with reference to the accompanying drawings.

Figure 2:
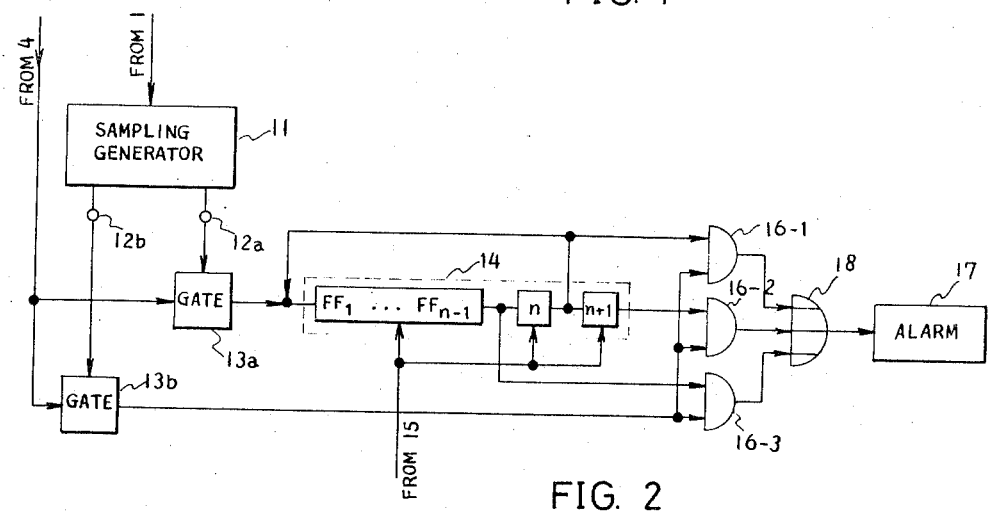
Figure 3:
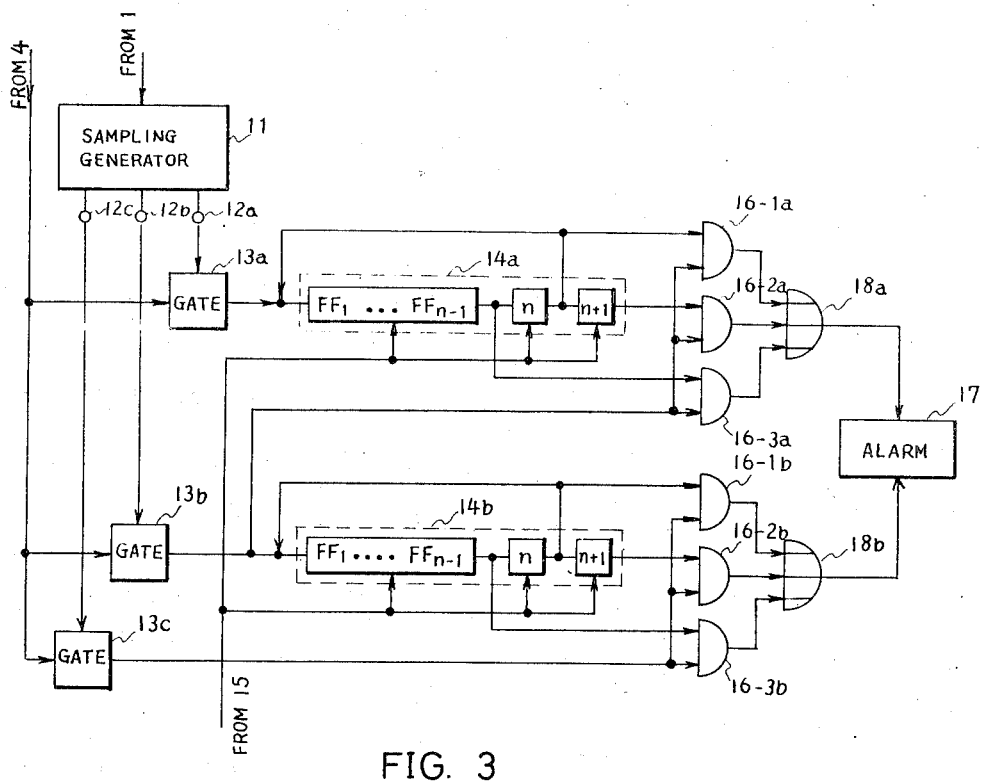
Figure 4:
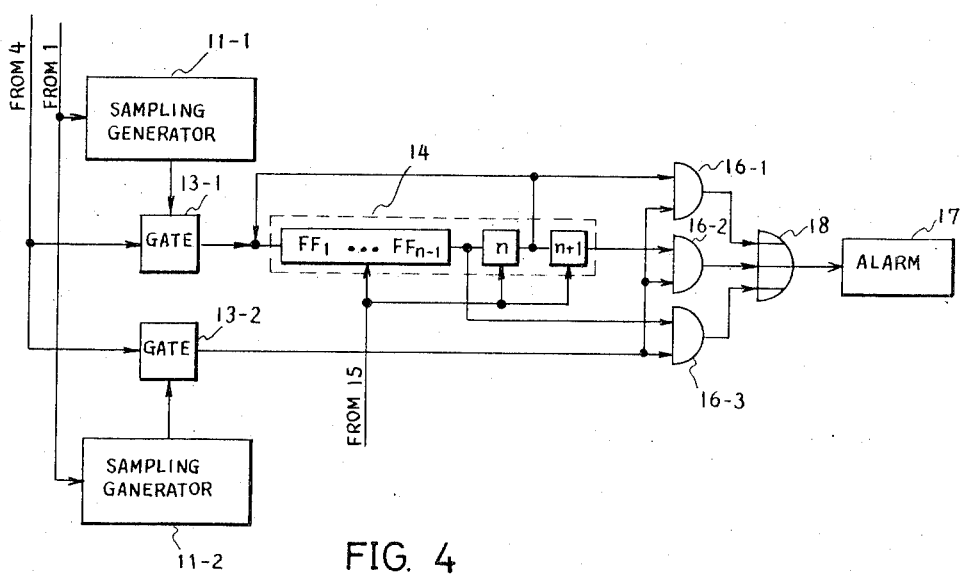
Figure 5:
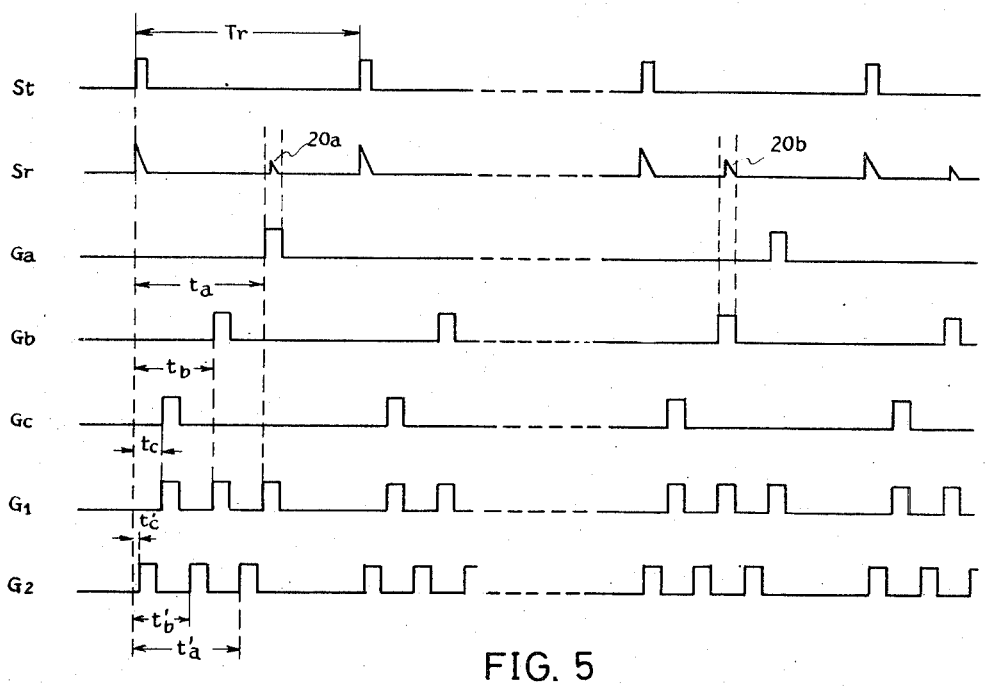
Figure 6:
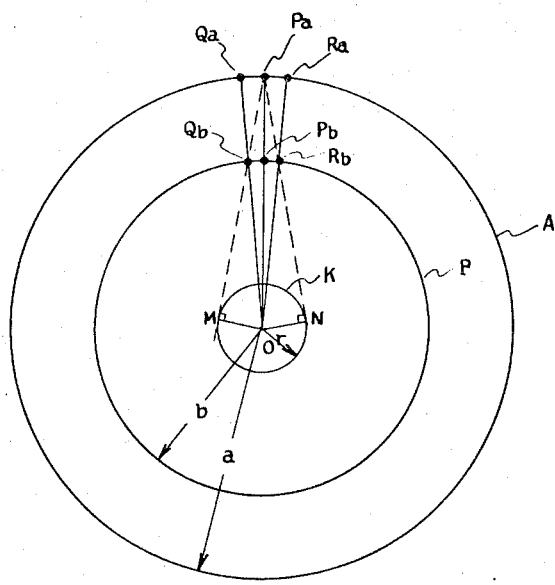
Figure 7:
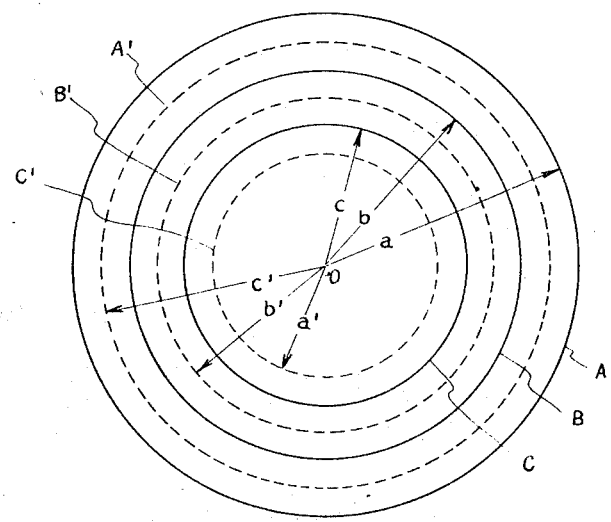
Figure 8:
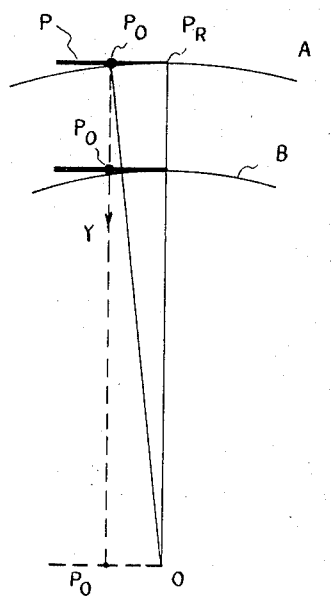
Figure 9:
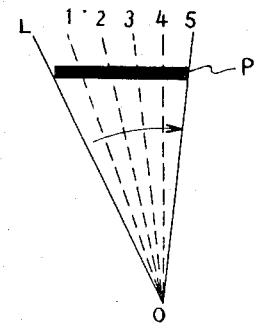
Figure 9:
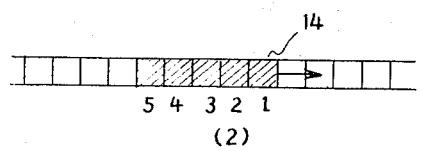
Figure 10:
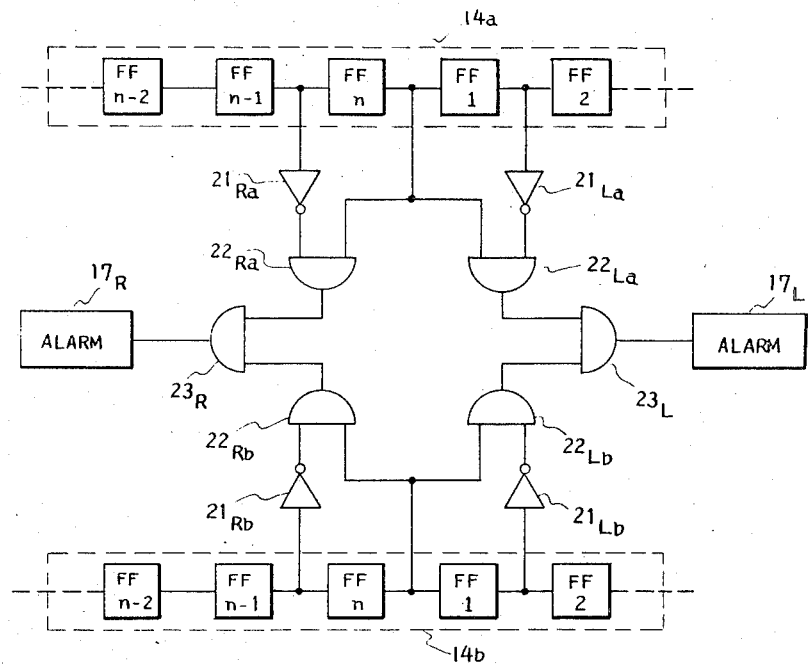
Figure 11:
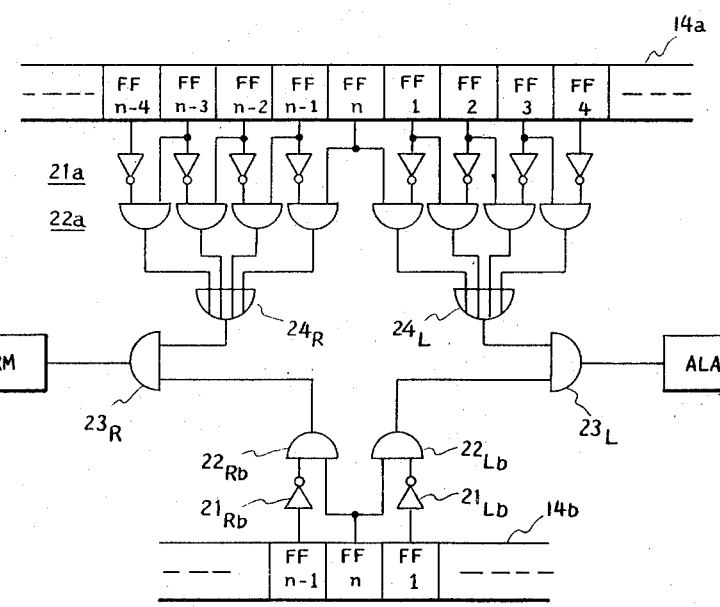

In the Drawings:

FIG. 1 is a block diagram representing a first embodiment of the system of this invention, FIG. 2 is a block diagram representing in part a variation of the embodiment of FIG. 1, FIG. 3 is a block diagram representing in part another variation of the embodiment of FIG. 1, FIG. 4 is a block diagram representing in part a modification of the embodiment of FIG. 3, FIG. 5 is a waveform diagram for explaining operation of the systems of FIGS. 1 through 4, FIGS. 6 and 7 are graphic charts representing the radar screen and illustrating the operation of the system of this invention, FIGS. 8 and 9 are graphic charts for explaining operation of a second embodiment of the system of this invention, FIG. 10 is a block diagram representing in part the second embodiment of the system of this invention, and FIG. 11 is a block diagram representing in part a variation of the embodiment of FIG. 10.

Throughout the drawings, like reference numerals are used to denote like structural components in order to clarify the relation of the various components in the respective drawings and facilitate understanding of the configuration according to this invention.

Referring now to FIG. 1, the embodiment of this invention, which is constructed for ships, comprises a first section, which corresponds to a radar device of prior art for transmitting a pulse wave and receiving its echo to display it on a screen and a second section, which is the subject matter of this invention, for detecting the possibility of collision and producing an alarm. The first section includes a pulse generator 1 for producing a periodic pulse train, a transmitter 2 for serving the function of amplification and the like of the pulse train, a directive rotary antenna for radiating the pulse signal as a beam wave and sweeping it around the subject ship and also receiving the pulse signal reflected from the object ship, a receiver 4 serving the function of amplification and the like of the received signal, an amplifier 5, a cathode ray tube 6 having a cathode electrode 7 and a rotary deflection yoke 9 for displaying the received signal, a saw-tooth generator 8 for generating a saw-tooth wave used for radial scan of the electron beam of the cathode ray tube 6, and a synchronizing device 10 for rotating the deflection yoke 9 in synchronization with the rotary antenna 3.

The second section includes a sampling pulse generator 11 having two output terminals 12a and 12b, normally closed gates 13a and 13b controlled by the outputs from the terminals 12a and 12b of the sampling pulse generator 11, respectively, a shift register 14 consisting of n number of flip-flops $FF_1$, $FF_1$ .... $FF_n$ and having the output of the gate 13a as its input, the output of the register 14 (i.e. output of $FF_n$) being returned to its input, a clock pulse generator 15 for generating a clock pulse train used for driving the respective flip-flops, an AND gate 16 having the outputs of the shift register 14 and gate 13b as its inputs, and an alarm device 17 driven by the output of the AND gate 16.

The operation will now be described with reference to FIGS. 5 and 6.

Assuming that the pulse generator 1 generates a train of pulses St having a period Tr and the receiver 4 receives a reflected signal having a waveform Sr as shown in FIG. 5, signals 20a and 20b on the waveform Sr will be displayed as two spots Pa and Pb on the display screen of the cathode ray tube 6 as well known in the art and these spots Pa and Pb will be positioned respectively on concentric circles A and B having radii a and b respectively, where a is gretaer than b, as shown in FIG. 6. If both spots Pa and Pb are on the same radius as shown in the drawing, this means that both ships are in a dangerous condition of future collision.

The sampling pulse generator 11 is controlled by the output pulse train St from the pulse generator 1 to generate a train of pulses Ga from the terminal 12a and a train of pulses Gb from the terminal 12b. Both pulse trains Ga and Gb have the same period Tr as the pulse train St but they are delayed respectively by ta and tb from St. This can be easily carried out, for example, by delaying the pulse St by means of a monostable multivibrator circuit provided in the sampling pulse generator 11. Assuming that the delay times ta and tb are selected to correspond to the distance $a$ and $b$, the received signals 20a and 20b will be respectively gated by the gates 13a and 13b since the received waveform Sr is supplied to both gates and the gates are controlled by the pulses Ga and Gb respectively. Therefore, the circles A and B will be called "gate circles."

The signal gated by the gate 13a is applied to the first flip-flop $FF_1$ of the shift register 14 and successively shifted through the flip-flops $FF_2$ to $FF_n$ and the output of the last flip-flop $FF_n$ is returned to the first flip-flop $FF_1$ under the control of a clock pulse train generated by the clock pulse generator 15. The frequency of the clock pulse train is previously synchronized with rotation of the rotary antenna 3 so that the time of one circulation of the signal in the register 14 is equal to the time of one rotation of the rotary antenna 3. Therefore, the shift register 14 stores the signal for one rotation of the antenna and feeds it out at every rotation and at the time points corresponding to the common radius $\overline{PaO}$. In other words, the shift register 14 produces its output every time the antenna points to the direction of the radius $\overline{PaO}$, and the output is applied to the AND gate 16 at that time.

Furthermore, the signal 20b reflected by the object ship at Pb is gated by the pulse Gb and directly applied to the AND gate 16. Accordingly, the AND gate 16 produces an output at the time the object ship reaches the position Pb and the output is applied to the alarm device 17 to produce an alarm. It is clear that the alarm device 17 is energized by the output of the AND gate 16 only when the object ship detected at Pa is again detected at Pb, but never energized when it comes out of the point Pb.

As described in the above, the embodiment of FIG. 1 can produce an alarm when the object ship points correctly to the direction of the subject ship and a perfect collision of both ships is expected. However, it is common practice to regard it as an emergency that the object ship is navigating on a course which will result in the closest distance at a future time between both ships, which is less than a predetermined distance. Such emergency can produce an alarm by the variation of FIG. 2.

The configuration of FIG. 2 is quite similar to that of FIG. 1, except that three AND gates 16–1, 16–2 and 16–3 are provided and the outputs of these AND gates are applied to the alarm device 17 through an OR gate 18 and that one input of the AND gates 16–1, 16–2 and 16–3 is supplied respectively from the n-th flip-flop $FF_n$, $(n+1)$th flip-flop $FF_{n+1}$ and $(n-1)$th flip-flop $_{n-1}$, while the other inputs are supplied directly from the gate 13b. Although the (n+1)th flip-flop $FF_{n+1}$ is shown in the drawing as a separate flip-flop located next to the n-th flip-flop $FF_n$, it should be noted that it is only shown for the purpose of preventing confusion in the drawing and, in practice, it is equivalent and identical to the first flip-flop $FF_1$.

According to this configuration, the flip-flop $FF_n$ produces an output periodically corresponding to the direction $\overline{PaO}$ in the same manner as the flip-flop $FF_n$ of FIG. 1, but the flip-flop $FF_{1-1}$ and $FF_{n+1}$ produce outputs respectively and periodically corresponding to the directions $\overline{QaO}$ and $\overline{RaO}$ which are respectively located before and after the direction $\overline{PaO}$ by one bit as shown in FIG. 6. Therefore, the AND gates 16–3 and 16–2 produce outputs even when the object ship is detected at Qb and Rb respectively at the time point corresponding to the distance $b$, in addition to the output of the AND gate 16–1 at Pb. If the distances $a$ and $b$ and the number $n$ of the flip-flops included in the shift register 14 are appropriately selected so that the radius $r$ of a concentric circle K which has a pair of tangents $\overline{PaM}$ and $\overline{PaN}$ passing the points Qb and Rb, it is possible to cause the OR gate 18 to produce an output for energizing the alarm device 17 as long as the object ship detected by the gate 13a at Pa comes onto the arc Qb – Rb of the circle B. This means that the above mentioned emergency on the closest distance will produce an alarm.

FIG. 3 shows a second variation of the embodiment of FIG. 1. As will be evident from the drawing, this configuration includes two stages each of which is equivalent to the stage of FIG. 2 and both utilize a gate 13b. The first stage consists of a gate 13a, a shift register 14a, three AND gates 16–1a, 16–2a and 16–3a, an OR gate 18a and a gate 13b, and the second stage consists of the common gate 13b, a shift register 14b, three AND gates 16–1b, 16–2b and 16–3b, an OR gate 18b and a gate 13c. The alarm device 17 is energized by either of the outputs of the OR gates 18a and 18b.

In this configuration, three sampling pulse trains Ga, Gb and Gc (FIG. 5) are produced from the sampling pulse generator 11. The delay times $t_a$, $t_b$ and $t_c$ of these pulse trains with respect to the pulse train St are previously selected to correspond to distances $a$, $b$ and $c$ respectively. This means that three gate circles A, B and C having radii $a$, $b$ and $c$ respectively are provided as shown in FIG. 7. When an object ship comes from the outside of the circle A toward the center (i.e. subject ship), it will be first detected by the sampling pulse Gb and actuates the alarm device 17 when it comes on the circle B. As the object ship will be detected once more by the sampling pulse Gc when it comes on the circle C, it will also activate the alarm device 17 at that time. This means that if the operator should miss the first alarm at the gate circle B, he would not miss the second alarm at the gate circle C. In other words, the second stage of this arrangement serves the function of a safety device.

FIG. 4 shows an arrangement which is much simpler in construction that that of FIG. 3 but can serve substantially the same function as the latter. As shown in the drawing, this arrangement is substantially the same as that of FIG. 2, except that two gates 13–1 and 13–2 corresponding to the gates 13a and 13b of FIG. 2 respectively, are respectively provided with sampling pulse generators 11–1 and 11–2. The sampling pulse generators 11–1 and 11–2 produce pulse trains $G_1$ and $G_2$ as shown in FIG. 5 based upon the pulse train St. Each of these pulse trains can be regarded as a train of pulse groups, each group including three pulses and the period of circulation of the group being equal to the period $T_r$ of the pulse train St. The three pulses of the pulse train $G_1$ have delay times $t_a$, $t_b$ and $t_c$ respectively and those of the pulse train $G_2$ have delay times $t_a'$, $t_b'$ and $t_c'$ respectively, with respect to the pulse train St. This means that two groups of gate circles are provided, as shown in FIG. 7, the first group consisting of A, B and C and belonging to the gate 13–1 and the second consisting of A', B' and C' and belonging to the gate 13–2. According to this arrangement, therefore, the object ship is detected by the gate 13–1 every time it comes on the circles A, B and C and activates the alarm device 17 every time it comes on the circles A', B' and C', respectively. This means that an object ship coming from the outside of the circle A toward the center (subject ship) O activates the alarm three times and thus provides a double safety device. However, this arrangement cannot judge whether the object ship is coming toward the subject ship or is going away from the subject ship and may also produce an alarm when an object ship detected at the circle B by the gate 13–1 is again detected at the circle A' by the gate 13–2, for example. In using this arrangement, therefore, the navigating direction of the object ship must be determined by other means, such as a radar display.

According to the above mentioned embodiments, the object is detected as a point even if it has some lateral width and the width is concentrated at its middle point. There will be no trouble when the object is a small body such as a small boat or buoy, but substantial trouble may be caused when it is a body having a significant lateral dimension such as a large ship or island, as will be described.

In FIG. 8 assume that an object P having a lateral dimension the approaching the subject O in the direction of arrow Y. As the above mentioned arrangements detect such object as a point $P_O$ which is the middle point of the object, they detect the object on the gate circle A as the point $P_O$ but cannot detect it on the gate circle B because the point $P_O$ is off the radius $\overline{P_OO}$ at this time. In this condition, however, the right end $P_R$ of the object will come to the point O in the future and the subject ship will collide with the object at its right end. In order to prevent such a danger, another embodiment of this invention is provided with a safety device for such an emergency caused by the lateral dimension of the object.

When an object P has a lateral dimension which is included within five parts of n-section of the sweeping angle (360°), for example, and is swept by a radar beam $\overline{OL}$ in the direction of the arrow as shown in FIG. 9(1), the corresponding reflected signal is stored in adjoining five flip-flops of the shift register 14 in an opposite direction as shown in FIG. 9(2) and shifted from left to right as shown by the arrow. Therefore, in order to detect the right end of the object, the leftmost one of the five effective bits "1" should be detected and vice versa. Such detection can be done by an embodiment of this invention as shown in FIG. 10.

In this embodiment the signals from the gates 13a and 13b of FIG. 1 are respectively applied to shift registers 14a and 14b. Both shift registers consist of n flip-flops respectively, but only five flip-flops $FF_{n-2}$, $FF_n$, $FF_1$ and $FF_2$ are shown in the drawing. The output of the flip-flop $FF_{n-1}$ is supplied through a NOT gate $21_{Ra}$ to one input of an AND gate $22_{Ra}$, the output of the flip-flop $FF_1$ is supplied through a NOT gate $21_{La}$ to one input of an AND gate $22_{La}$ and the output of the flip-flop $FF_n$ is directly supplied to the other inputs of the AND gates $22_{Ra}$ and $22_{La}$. A similar connection is provided for the shift register 14b as shown in the drawing. The outputs of the AND gates $22_{Ra}$ and $22_{Rb}$ are applied to an AND gate $23_R$ and the outputs of the AND gates $22_{La}$ and $22_{Lb}$ are applied to an AND gate $23_L$. The output of the AND gate $23_R$ is applied to a right end alarm device $17_R$ and the output of the AND gate $23_L$ is applied to a left end alarm device $17_L$.

When the five effective bits of FIG. 9(2) are shifted successively to the right and the rightmost bit comes in the flip-flop $FF_{n-1}$ of the register 14a, that is, when the five flip-flops of the drawing store a binary 11000, the AND gate $22_{Ra}$ produces no output. However, when the leftmost bit comes in to the flip-flop $FF_n$, that is, when the five flip-flops store a binary 00111, the AND gate $22_{Ra}$ clearly produces an output. Thus, the AND gate $22_{Ra}$ detects the leftmost bit, that is, the right end of the object. According to the same principle, the AND gates $22_{Ra}$ and $22_{Rb}$ can detect the right end of the object and the AND gates $22_{La}$ and $22_{Lb}$ can detect the left end thereof. Accordingly, it will be easily understood by those skilled in the art that the alarm device $17_R$ can be activated upon the approach of the right end of the object and the alarm device $17_L$ can be activated upon the approach of the left end of the object. Thus, the system of this embodiment can correctly judge whether the course of the object passes the left of the subject or the right thereof.

The embodiment of FIG. 11 is constructed in accordance with the same principle as that of FIG. 10 and under consideration of the closest distance as in the case of the variation of FIG. 2. In this arrangement, nine flip-flops of the shift register 14a are coupled to four AND gates 22a through respective NOT gates 21a and the outputs of these AND gates are supplied through two OR gates $24_R$ and $24_L$ to the AND gates $23_R$ and $23_L$. In this case, the end bit detection capability of the register 14a is extended to both sides by three bits respectively. Therefore, according to the principle described above in conjunction with the variation of FIG. 2, an emergency alarm can be produced keeping an appropriate close distance. As this is self-evident, further explanation will be omitted.

As described in the above, according to this invention, the possibility of a collision can be automatically signalled with no connection to the radar display. The alarm may be visual or a sound indication or the combination thereof. The number of flip-flops n included in the register may be properly selected in consideration of cost, reliability, use of the system and the like. Though the above description has been made in conjunction with the system embodied in a ship radar which is used in two-dimensional fashion, the same principle can be applied to three-dimensional radar such as air radar and the like. Moreover, this invention can be applied not only to radar devices but also sonic devices such as supersonic sonar. In addition, the shift register may be replaced by a magnetic recording tape which is moved in synchronization with the rotation of the antenna. It should be noted that these variations are all included in the technical range of this invention.

What is claimed is:

1. A collision alarm system comprising a transmitting and receiving device for emitting a directive periodic pulse wave which sweeps a predetermined space in a predetermined period, and receiving a reflected wave thereof, first sampling means for sampling said received reflected wave at a first time point within the pulse interval of said pulse wave, second sampling means for sampling said received reflected wave at a second time point within said pulse interval, storing means for storing the sample signal sampled by said first sampling means and feeding out said signal at every cycle of said sweep, comparing means for comparing the output signal of said storing means with the sample signal sampled by said second sampling means and producing an output when the both coincide, and an alarm device driven by said output of said comparing means.

2. A collision alarm system according to claim 1 wherein said storing means is arranged so that the memory content is fed out at respective time points before, at and after the completion of said sweep cycle, and said comparing means is arranged so that an output is produced when either one of said outputs coincides with said sample signal of said second sampling means.

3. A collision alarm system according to claim 1 wherein said first and second sampling means are arranged to effect a plurality of samplings at said first and second time points respectively, whereby the output is produced from said comparing means when the sample signals at each sampling of both time points coincide with each other.

4. A collision alarm system according to claim 1 wherein said storing means is a shift register including a plurality of serial flip-flops driven by a clock pulse which is synchronous with said period of sweeping.

5. A collision alarm system comprising a transmitting and receiving system for emitting a directive periodic pulse wave which sweeps a predetermined space in a predetermined period, and receiving a reflected wave thereof, first sampling means for sampling said received reflected wave at a first time point within the pulse interval of said pulse wave, second sampling means for sampling said received reflected wave at a second time point within said pulse interval, first storing means for storing the sample signal by said first sampling means and feeding it out during each cycle of sweep as first, second and third output signals at respective time points before, at and after the completion of said cycle of sweep, second storing means for storing the sample signal sampled by said second sampling means for a time period corresponding to said period of sweep and feeding it out as first, second and third output signals at respective time points before, at and after the completion of said cylcle of sweep, first comparing means for comparing said first and second output signals of said first and second storing means and producing an output when both first outputs are absent and both second outputs are present, second comparing means for comparing said second and third output signals of said first and second storing means and producing an output when both second outputs are present and both third outputs are absent, and first and second alarm devices driven by the outputs of said first and second comparing means respectively.

6. A collision alarm system according to claim 5 wherein each of said first and second storing means is a shift register including a plurality of serial flip-flops driven by a clock pulse which is synchronous with said period of sweep, and said first, second and third outputs are respectively fed out from the second flip-flop from the last, the last flip-flop and the first flip-flop.

* * * * *